United States Patent

Scheffler et al.

[15] 3,644,987

[45] Feb. 29, 1972

[54] METHOD FOR MANUFACTURING SUPERCONDUCTORS

[72] Inventors: Ernst Scheffler, Langenhagen; Gerhard Ziemek, Hannover, both of Germany

[73] Assignee: Kabel-und Metallwerke Gutehoffnungshutte Aktiengesellschaft, Hannover, Germany

[22] Filed: Mar. 2, 1970

[21] Appl. No.: 16,335

[52] U.S. Cl...........29/599, 29/DIG. 11, 174/126 CP;DIG. 6, 335/216

[51] Int. Cl.........................................................H01v 11/00

[58] Field of Search................29/599, DIG. 11; 174/126 CP, 174/DIG. 6; 335/216

[56] References Cited

UNITED STATES PATENTS

| | | | |
|---|---|---|---|
| 3,243,871 | 4/1966 | Saur | 29/599 |
| 3,358,361 | 12/1967 | Kolbe | 29/599 |
| 3,473,217 | 10/1969 | Prior | 29/599 |
| 3,218,693 | 11/1965 | Allen et al. | 29/599 |

*Primary Examiner*—John F. Campbell
*Assistant Examiner*—Donald C. Reiley, III
*Attorney*—Smyth, Roston & Pavitt

[57] ABSTRACT

A tin-plated copper wire is lined with a tape containing niobium to form a closed sleeve around the wire. The sleeve is drawn onto the wire and heat-treated to obtain diffusion of tin into the niobium.

8 Claims, 1 Drawing Figure

Patented Feb. 29, 1972 3,644,987
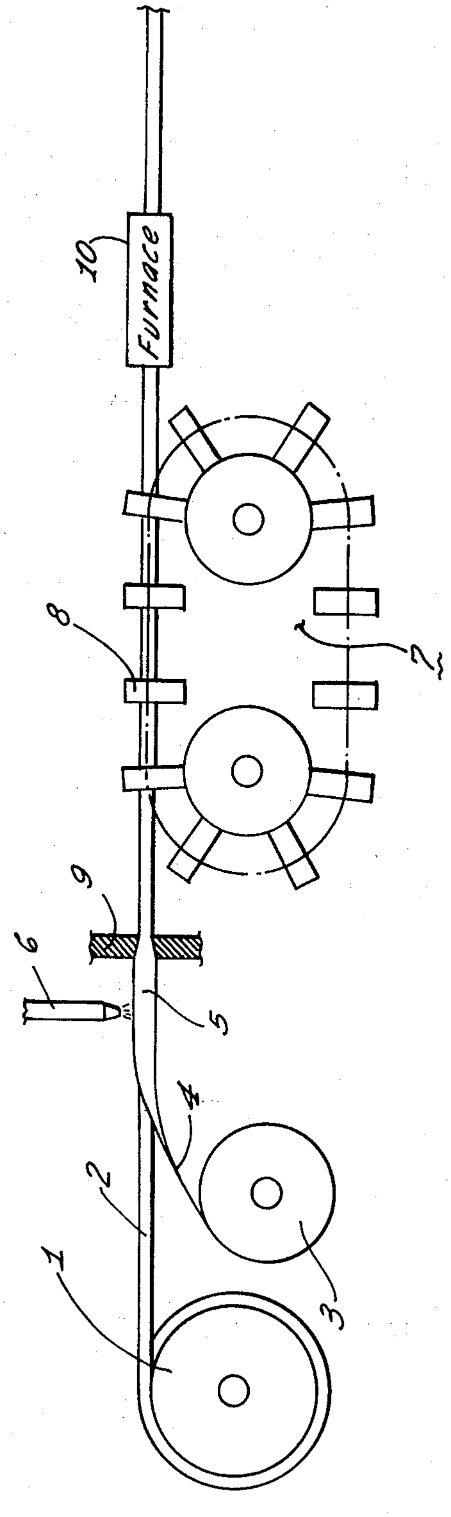
INVENTORS:
Ernst Scheffler
Gerhard Ziemek
By Smyth, Roston & Pavitt
ATTORNEYS

METHOD FOR MANUFACTURING SUPERCONDUCTORS

The present invention relates to a method and process for making superconductors.

It is known to provide a superconductor of any configuration, such as wire, by first providing a particularly and correspondingly shaped carrier object and by providing the carrier with a surface layer to obtain a superconductor. That surface layer is usually an alloy and/or a compound which includes at least two components. In particular the carrier such as a wire is made first of niobium, vanadium, or tantalum and at least a portion of the surface of such object is modified by providing thereto the other component, such as tin, aluminum, gallium or silicon. That latter material is caused to diffuse into the carrier, for example at a rather high temperature, such as 900° to 1,200° C.

As a consequence a superconductive layer is provided in a surface stratum of the carrier object which layer, however, is easily subjected to wear and is not very abrasionproof. This was found to be particularly disadvantageous if the carrier is a wire intended to serve as a part of a superconductive, cryogenic cable.

The superconductor to be made in accordance with the present invention constitutes likewise, essentially, a plural layer construction with a carrier and a particular layer comprising the superconductor proper. The invention utilizes also the principles of diffusion in order to establish particular layering. The invention, therefore, is based particularly on the principle of obtaining a superconductive layer as an alloy and/or compound of at least two different components.

In accordance with the present invention it is suggested to provide first a carrier, such as an elongated carrier, for example, a wire, and having a surface layer which is one of at least two components to be alloyed, or to be combined with another component, for obtaining the superconductor. The particular component on the carrier has a lower melting temperature than the other component or components to be used. A thin-walled sleeve is formed about that carrier, using a rather thin, longitudinally extending tape which is folded progressively around the carrier. The tape includes the other component or components having a melting temperature above the temperature required for diffusion of the first mentioned component. The tape after having been longitudinally folded around the carrier is welded along its edges to close the sleeve. That sleeve is now drawn onto and applied directly through drawing to the carrier to obtain intimate contact with the surface layer on the carrier. The thus produced assembly is subjected to a thermal treatment to obtain diffusion of the two components into each other. Particularly, the temperature will be above the melting point of the layer component on the carrier and that material will diffuse into adjoining surface strata of the sleeve. These surface strata are, however, along the inner wall surface of sleeve and in intimate contact with the layer on the carrier due to the preceding drawing.

By way of example, a copper wire may be provided with a tin layer. As the tin-plated copper wire runs longitudinally through the manufacturing and production line a niobium tape is caused to run likewise into that line and in longitudinal direction thereto. The tape is shaped to obtain a sleeve lining about the tin-plated copper wire. That niobium sleeve is welded in longitudinal direction along the now adjoining edges of the tape. Next, the thus formed sleeve is drawn upon the tin-plated copper wire to be applied firmly thereto.

The wire-sleeve assembly made in accordance with the invention has the advantage that it may be heated well above the melting temperature of tin (but, of course, below the melting temperature of the niobium) whereby such heating does not produce any difficulties. Particularly, the tin does not have opportunity to turn off as there is no exposed tin surface. Instead, the tin layer is completely lined and covered by the niobium sleeve. The result of the heat treatment is diffusion of tin into niobium to obtain the desired niobium-tin compound, having a relatively high critical superconductive temperature at high magnetic field resistance. That niobium-tin layer is, of course, firmly connected to the carrier, as tin layer and niobium tape fuse to obtain an integral structure.

The thickness of the niobium-tin layer depends upon the temperature maintained for and during the heat treatment, and, of course, that thickness depends also upon the time of exposure to thermal energy. By appropriately controlling and selecting duration of thermal treatment as well as the temperature thereof, the thickness of that layer can be controlled rather easily and at a high degree of accuracy. By way of example a heat treatment at 950° to 1,200° C. for a duration of 1 to 3 hours will result in an internal diffusion layer of a few microns layer thickness. The superconductor layer needs to be only a few microns thick. Such a thin layer is not very brittle which is of considerable advantage.

It appears that the superconductive layer proper is actually disposed between the carrier and an outer coating as provided by the sleeve which serves for protection of the layer. If copper is used as carrier there is the added advantage that copper expands more than the layers thereon during the heat treatment. The copper carrier, therefore, presses for example the tin layer, i.e., the component having the lowest melting point, against the sleeve so that formation of cavities is avoided; such cavities could very well disturb consistency of the superconductive layer.

It was mentioned above that the tape to be formed to a tube for lining the carrier is made of niobium; instead one could use a tape of niobium alloy or of a niobium compound. One could however also use other types of material such as niobium-plated sheetlike metal tapes. The carrier as stated can be a copper wire which has been tin-plated. More generally the carrier may be comprised of a metal wire plated with a metallic layer capable of diffusing into the niobium of the tape after it has been applied to the carrier. Essential here is that the layer on the carrier has a melting temperature which is actually below the temperature required and used for diffusion into host material, which material is the component included in the tape, such as niobium. The tape used to line the carrier wire includes the host and is deformed as sleeve around the wire whereupon the sleeve is drawn onto the carrier to be heated above the melting temperature of the metal plating on the carrier to cause its diffusion into the host material. The preceding drawing step places the host material of the sleeve into intimate contact with the plating on the wire, so that the diffusion process produces a uniform diffusion layer.

The plating of the carrier wire may be obtained in the same process. An unplated copper wire may be unreeled from drums or the like, to run through a tin bath or a bath with tin alloy or the copper wire is exposed to tin vapor, to obtain tin plating. Immediately after plating the plated wire is lined with the niobium tape.

The tape to be formed to obtain a sleeve for lining the carrier should have thickness in the range of 0.03 to 0.5 millimeter. Preferably a tape having thickness within the range of 0.05 to 0.2 millimeter is being used. Formation of a sleeve from such a tape with subsequent longitudinal seam welding permits continuous production of a superconductor whereby choice of the carrier material and particularly choice of the dimensions thereof permits the superconductor to be made flexible.

The superconductive layer proper is formed between the plated carrier and the sleeve lining thereon. In dependence upon its thickness the superconductive layer is brittle to some extent. It is, therefore, of advantage to work the lined wire prior to heat treatment, for imparting upon the wire construction the desired final dimensions and configuration. This refers particularly to drawing of the sleeve onto the carrier so that the sleeve is being applied firmly to the carrier wire. Generally, these forming steps may include steps to reduce the diameter of the sleeve-lined wire which is instrumental in obtaining favorably uniform conditions for the subsequent diffusion. The thus made superconductive wire (not yet fully superconductive that is) can be wound in any desired length on reels, drums or the like and at any time thereafter the wire will undergo heat treatment to obtain diffusion and formation of the superconductive layer proper.

In the most simple form the wire after having been lined is wound upon a reel or drum, and in that state it is placed into an annealing furnace for heating and annealing the wire up to a temperature within the range of 900° or 1,200° C. Now the plating diffuses into the tape to the desired degree, depending upon the chosen temperature and upon the duration of annealing. In the alternative it may also be of advantage to establish heat treatment differently, namely, the coil of wire as wound on the storage reel or drum is passed through by an electric current of sufficient magnitude so as to heat the wire to the required temperature and for a duration as determined by the desired intensity and duration for the diffusion process.

In each case it is essential for the invention that the component with the lowest melting point, for example, the tin layer is physically maintained in the interior of the niobium coating or sleeve, even at these high temperatures, so that an uninterrupted coherent superconductive layer is provided, more or less in the interior of this wire structure, underneath the sleeve and on top and along the carrier, as diffusion layer therebetween.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically and by way of example an elevational view of a production line for making a superconductor in accordance with the invention.

A tin-plated copper wire 2, for example, is unreeled from a supply drum 1 and passed into the production line. Parallelly thereto a niobium tape 4 is unreeled from a suitable supply reel 3. The niobium tape runs into the propagation path for the tin-plated copper wire, and by means of suitable forming rolls which are not illustrated, tape 4 is longitudinally deformed and progressively folded around wire 2 to obtain a sleeve 5 for lining the copper wire. The thus formed tube or sleeve 5 is longitudinally welded, for example, by means of welding equipment 6, and, preferably, welding is carried out in a protective gas atmosphere.

A caterpillar with tension brackets or jaws 8 is provided for firmly gripping sleeve 5 in progressing locations to cause drawing of the welded sleeve 5 onto the tin layer of wire 2, that layer now being in the interior of sleeve 5. The drawing is carried out by pulling the sleeve through a die 9 and onto tin-plated copper wire 2. The drawing illustrates a single-stage drawing process, but it may be of advantage to provide plural stages for drawing, using two or three dies in order to stepwise draw and apply sleeve 5 onto the tin-plated copper wire 2 and in intimate contact therewith. Lined and plated wire may be drawn further in order to obtain still smaller dimensions for the superconductor as desired.

After the desired dimensions for the sleeve-lined wire have been obtained and after the sleeve 5 is internally in intimate contact with the tin-plated wire, the thus lined wire may for example be passed through an annealing furnace 10 illustrated schematically only and arranged behind the caterpillar withdrawal equipment 7. As the wire passes through the annealing furnace it is subjected to heat treatment at a temperature for example in the range of 950° to 1,200° C. The wire is maintained for that time in a protective gas atmosphere or in vacuum. During this heat treatment niobium and tin diffuse, particularly the tin diffuses into the niobium, and an internal layer which has considerable superconductive properties is obtained. The wire leaving the furnace is reeled onto a supply drum 11 in a manner known per se.

With regard to the required annealing durations particular conditions are posed for the furnace 10. It may be impractical for the given production speed to provide a very long furnace so that a reasonable size furnace may be insufficient to obtain a diffusion layer of the desired thickness. Therefore the sleeve-lined wire can be reeled first, after the drawing process, to obtain a coil, and for annealing an electric current is made to flow through the wire causing it to be internally heated. Alternatively, such a coil is placed into an annealing furnace for as long a time as is necessary.

One can readily see that the wire 2 may be provided with the required plating within the same production run. For example, there may be originally a copper wire which does not carry a tin plating. The copper wire is reeled from a suitable supply drum and runs through a tin bath prior to lining with the niobium tape. That lining process is then carried out right after the now tin-plated copper wire leaves the tin bath.

It may be of advantage to employ a plated metal tape, as such a tape has still sufficiently thin dimensions. For example, one can use a copper tape carrying a plating of niobium, and the particular side of the tape having the niobium layer is brought into abutment with wire 2. The niobium plating now becomes an internal layer of the formed sleeve. Subsequently, this sleeve is drawn onto the carrier as aforedescribed, with conceivably additional drawing steps involved for reducing the diameter of the wire-sleeve arrangement further. In either case, after the drawing process, the previous surface layer on the carrier and having relatively low melting point will be in intimate contact and in direct engagement with the other component, such as the internal niobium layer of the sleeve so that the subsequent diffusion process produces a uniform superconductive layer.

The invention is not limited to the embodiments described above but all changes and modifications thereof not constituting departures from the spirit and scope of the invention are intended to be covered by the following claims.

What is claimed is:

1. Process of making an electrical superconductor for use in cryogenic cables or the like, comprising the steps of:

providing an elongated carrier having a round cross section with a surface layer of a first component for a superconductive layer, the first component having relatively low melting point, the carrier made of different material and having a higher melting point;

providing a thin tape including a second component for a superconductive layer different from the carrier and from the first component and having melting point higher than said relatively low melting point of said first component;

progressively forming a sleeve by longitudinally folding the tape around the carrier in longitudinal direction and including progressively welding the folded tape edgewise in longitudinal direction to close the sleeve;

drawing the sleeve onto the carrier to obtain intimate engagement between the first and second components; and heat treating the carrier-sleeve arrangement as obtained by the preceding steps at a temperature below the melting point of the second component but above the melting point of the first component to cause the first component to diffuse into the sleeve to obtain a superconductive layer as composition or alloy of the first and second components.

2. Process as in claim 1, the first providing step including, providing a metal wire, and plating the wire with a layer of the first compound, to be lined immediately thereafter by the tape for forming the sleeve.

3. Process as in claim 1, the first providing step consisting of providing a copper wire as carrier with a layer of tin as first component, the second providing step consisting of providing a niobium tape.

4. Process as in claim 1, the second providing step consisting of providing a metal tape with a niobium layer.

5. Process as in claim 1, the second providing step consisting of providing a copper tape with a niobium layer.

6. Process as in claim 1, including the step of reeling the carrier with sleeve after the drawing step for subsequent heat treating.

7. Process as in claim 6, the heat-treating step comprising the step of feeding electric current through the carrier for heating same.

8. Process as in claim 1, the carrier being a metal wire, having been plated with a layer of the first compound, the plated carrier provided to run into a production line, the tape caused to run likewise into the line for deforming the tape, to line the wire on a continuous basis so as to provide a sleeve.

* * * * *